Patented Dec. 7, 1943

2,335,997

UNITED STATES PATENT OFFICE 2,335,997

PRODUCTION OF β-ALANINE AND β-ALANATES FROM ACRYLONITRILE

Gustaf Harry Carlson, Pearl River, and Charles Neil Hotchkiss, Nanuet, N. Y., assignors to Lederle Laboratories, Inc., New York, N. Y., a corporation of Delaware No Drawing. Application May 27, 1941,
Serial No. 395,386

10 Claims. (Cl. 260—534)

This invention relates to methods of preparing β-alanine and β-alanates and more particularly relates to a method of preparing β-alanine and the β-alanates from acrylonitrile.

One of the methods proposed in the past for the production of β-alanine is described in the United States Patent No. 1,992,615 wherein acrylonitrile is heated in an autoclave with anhydrous liquid ammonia at an elevated temperature and pressure to produce β-aminopropionitrile which may then be hydrolyzed in a separate step to β-aminopropionic acid (β-alanine). While this prior method is workable, it is readily seen that there are a number of steps necessary for carrying out the reaction and that special equipment is also necessary. Further, the overall yield of β-alanine from acrylonitrile is not particularly good since the reaction of strong ammonia with acrylonitrile results in the production of a considerable quantity of side reaction materials in addition to β-aminopropionitrile. It is commercially desirable, therefore, that β-alanine be prepared from acrylonitrile with improved over-all yields, employing a fewer number of steps and using less expensive equipment for carrying out the process.

In accordance with the present invention it has been discovered that β-alanine and also β-alanates can be produced from acrylonitrile by relatively simple and easily controlled reactions in a single operation which does not require the use of any specific type of equipment. When the process of the present invention is employed for the production of β-alanine, acrylonitrile is heated with an ammonium hydroxide solution of ammonium carbonate at temperatures ranging from 75° C. up to 150° C., or higher in some cases, for a period of time ranging from one to 24 hours, the length of time being dependent upon the temperature employed. For example at 150° C. the reaction is usually complete in about 5 to 6 hours and at 200° C. the time may be only 3 or 4 hours. When the process of the present invention is employed for the production of β-alanates from acrylonitrile, acrylonitrile is heated with a solution of an alkali metal hydroxide or a suspension of an alkaline earth metal hydroxide in ammonium hydroxide, employing conditions similar to those described above. In both instances, that is preparation of β-alanine and preparation of β-alanates from acrylonitrile, the addition of ammonia to acrylonitrile at the α,β-positions and hydrolysis of the cyano group take place in a single operation to result in a high over-all yield. When acrylonitrile is reacted with an ammonium hydroxide solution of ammonium carbonate under the conditions described above, the β-alanine produced is very easily isolated directly, or in the form of an inorganic acid salt, for example the hydrochloride or the sulfate. The hydrochloride or sulfate thus obtained can be very easily converted to β-alanine having a high degree of purity by neutralization with a suitable base. When acrylonitrile is reacted with a solution of an alkali metal basic salt or a suspension of an alkaline earth metal basic salt in ammonium hydroxide, the corresponding alkali metal or alkaline earth metal salts of β-alanine are obtained directly. When desired these salts of β-alanine can be converted into the free β-amino acid.

Ammonium carbonate, alkali metal hydroxide and alkaline earth metal hydroxides are preferred in the above-described processes. Instead thereof, however, the ammonium, alkali metal or alkaline earth metal salts of weak acids may be employed. Suitable weak acids the salts of which may be used include carbonic, acetic, propionic, in fact any aliphatic acid except those classified as strong acids. Aromatic acid salts such as those of benzoic and salicylic are also suitable. Similarly the hydroxy aliphatic acid salts such as those of lactic and alpha hydroxyisobutyric are suitable.

It is an advantage of the present invention that an improved process is provided for the production of β-alanine (β-aminopropionic acid) and salts from acrylonitrile which results in good yields and employs conditions which otherwise make the process an extremely desirable one in an economic sense.

It is a further advantage of this invention that a process is provided in which hydrolysis and ammonolysis of acrylonitrile are accomplished in a single operation to produce either β-alanine or β-alanates as desired.

The invention will be further illustrated in conjunction with the following specific examples. It should be understood, however, that the examples are for the purpose of illustration only and the invention is not limited to the details set forth therein.

*Example 1*

Acrylonitrile (50 g.) was added to a solution prepared from 150 g. of ammonium carbonate, 300 cc. of 28% ammonium hydroxide and 1200 cc. of water and the mixture was heated 5.5 hours at 150° C. The reddish solution was treated with decolorizing charcoal and solvent was removed from the filtered solution in vacuo. The syrupy residue was digested with 100 cc. of concentrated hydrochloric acid for 2 hours at 100° C., solvent was distilled in vacuo and the resulting syrup was dissolved in 250 cc. of glacial acetic acid. The filtered solution was concentrated in vacuo to a volume of 200 cc. and diluted with 500 cc. of isopropanol. Ten grams of β-alanine hydrochloride (M. P. 97–107°) was deposited, the filtrate was concentrated in vacuo to a volume of 250 cc. and diluted with 2 volumes of acetone. The crystalline hydrochloride (25.0 g., M. P. 107–110°) was filtered off and the filtrate, after concentration in vacuo and dilution with acetone, yielded 6.6 g. of β-alanine hydrochloride, M. P. 104–108° C. On similar retreatment the filtrate yielded 4.5 g. more of the hydrochloride, M. P. 105–110° C. Recrystallization of the crude β-alanine hydrochloride gave a product (M. P. 125–127°) which did not depress the melting point of an authentic specimen.

*Example 2*

Acrylonitrile (50 g.) was added to a solution prepared from 175 g. of ammonium carbonate, 300 cc. of 28% ammonia water and 700 cc. of water and the mixture was heated 8 hours at 150°. The solution was treated with decolorizing charcoal, the filtrate was evaporated to dryness in vacuo and the residue was digested 2 hours with 200 cc. of concentrated hydrochloric acid. Solvent was distilled in vacuo, the residue was dissolved in 150 cc. of glacial acetic acid and the solution, diluted with 200 cc. of acetone, deposited 40.5 g. of β-alanine hydrochloride, M. P. 103–107°. The filtrate, after concentration in vacuo, deposited 1 g. of ammonium chloride which is filtered off and the filtrate after dilution with acetone yielded 21.5 g. of β-alanine hydrochloride, M. P. 95–105°.

*Example 3*

A mixture of 53 g. of acrylonitrile, 500 cc. of water, 300 cc. of 28% ammonia water and 288 g. of ammonium carbonate was heated 8 hours at 150° C. The product was treated with decolorizing charcoal and solvent was distilled in vacuo from the filtrate. The residue was dissolved in 100 cc. of hot water, treated with decolorizing charcoal, and the filtrate was concentrated in vacuo to a volume of 100 cc. The crystalline product was filtered off, suspended in methanol and the β-alanine (M. P. 192–194°) was filtered off and washed with a little methanol. After recrystallization from aqueous alcohol a good yield of the free amino acid was obtained. From the original mother liquor, by adequate concentrations and dilutions with alcohol, more β-alanine may be isolated and, by adequate washing with methanol, separated from the colored impurity, formed in an inappreciable amount; or, in commercial processes, the combined and concentrated mother liquors may be used satisfactorily as solvent in subsequent preparations of β-alanine; or the residue obtained on concentration of the mother liquors may be digested with hydrochloric acid or other suitable acid, and the remaining product isolated as the salt corresponding to the amount employed.

*Example 4*

Acrylonitrile (53 g.) was heated with 300 cc. of 28% ammonia water, 37 g. of calcium hydroxide and one liter of water for eight hours at 150° C. Inorganic material (unchanged calcium hydroxide, 3.2 g.) was filtered off and solvent was distilled in vacuo from the filtrate leaving calcium β-alanate in a good yield.

*Example 5*

Acrylonitrile (53 g.), 40 g. of sodium hydroxide, 300 cc. of 28% ammonia water and one liter of water were heated 12 hours at 150° C., the product was treated with decolorizing charcoal and solvent was distilled in vacuo from the filtrate, to give a good yield of sodium β-alanate.

In the foregoing examples solutions of ammonium carbonate, sodium hydroxide, and suspensions of calcium hydroxide in ammonium hydroxide were employed. It should be understood, however, that these bases were used merely because of their ready availability and cheapness and that other alkali metal bases may be used instead, such as for example, potassium hydroxide or lithium hydroxide, and that other alkaline earth metal bases may be employed, such as barium hydroxide, or strontium hydroxide. The corresponding salts of weak acids mentioned heretofore likewise may be used. Similarly these examples wherein β-alanine was isolated in the form of the acid salts, sulfuric acid instead of hydrochloric acid may be employed, in which case the sulfate of β-alanine is obtained. In the examples, ammonium hydroxide solutions of about 10% strength were employed and are preferred; however, stronger solutions may be employed without seriously decreasing the yields.

We claim:

1. The process for producing β-alanine which comprises heating, in a closed vessel at a temperature of at least 150° C., acrylonitrile with aqueous ammonium hydroxide containing a basic substance of the group consisting of ammonium carbonate, alkali metal bases, and alkaline earth metal bases resulting in ammonolysis and hydrolysis of the acrylonitrile.

2. The process which comprises heating, in a closed vessel and at a temperature of at least 150° C., acrylonitrile with an aqueous ammonium hydroxide solution of ammonium carbonate resulting in ammonolysis and hydrolysis of the acrylonitrile to produce β-alanine.

3. The process which comprises heating, in a closed vessel and at a temperature of at least 150° C., acrylonitrile with an aqueous ammonium hydroxide solution of an alkali metal base resulting in ammonolysis and hydrolysis of the acrylonitrile to produce an alkali metal salt of β-alanine.

4. The process which comprises heating, in a closed vessel and at a temperature of at least 150° C., acrylonitrile with a suspension of an alkaline earth metal base in aqueous ammonium hydroxide resulting in ammonolysis and hydrolysis of the acrylonitrile to produce an alkaline earth metal salt of β-alanine.

5. The process which comprises heating, in a closed vessel and at a temperature of at least 150° C., acrylonitrile with an aqueous ammonium hydroxide solution of an alkali metal hydroxide resulting in ammonolysis and hydrolysis of the acrylonitrile to produce an alkali metal salt of β-alanine.

6. The process which comprises heating, in a closed vessel and at a temperature of at least 150° C., acrylonitrile with a suspension of an alkaline earth metal hydroxide in aqueous ammonium hydroxide resulting in ammonolysis and hydrolysis of the acrylonitrile to produce an alkaline earth metal salt of β-alanine.

7. The process which comprises heating, in a closed vessel and at a temperature of at least 150° C., acrylonitrile with an aqueous ammonium hydroxide solution of sodium hydroxide resulting in ammonolysis and hydrolysis of the acrylonitrile to produce the sodium salt of β-alanine.

8. The process which comprises heating, in a closed vessel and at a temperature of at least 150° C., acrylonitrile with a suspension of calcium hydroxide in aqueous ammonium hydroxide resulting in ammonolysis and hydrolysis of the acrylonitrile to produce the calcium salt of β-alanine.

9. The process of producing β-alanine which comprises heating acrylonitrile with an ammonium hydroxide solution of ammonium carbonate at a temperature of about 150° C.

10. The process according to claim 9 in which the β-alanine is isolated as the hydrochloride.

GUSTAF HARRY CARLSON.
CHARLES NEIL HOTCHKISS.